(12) United States Patent
Takyar et al.

(10) Patent No.: US 8,538,679 B1
(45) Date of Patent: Sep. 17, 2013

(54) ENHANCED GEOCODING

(75) Inventors: Akash Takyar, New Delhi (IN); Shaifali Garg, New Delhi (IN)

(73) Assignee: Oberweis Dairy, Inc., North Aurora, IL (US)

( * ) Notice: Subject to any disclaimer, the term of this patent is extended or adjusted under 35 U.S.C. 154(b) by 248 days.

(21) Appl. No.: 13/083,136

(22) Filed: Apr. 8, 2011

(51) Int. Cl.
*G01C 21/00* (2006.01)

(52) U.S. Cl.
USPC ............ 701/408; 701/520; 701/521; 701/526; 701/527; 701/532; 701/468; 701/431; 701/447; 707/921; 707/912; 707/919; 707/918; 707/922; 455/457; 455/456.1; 455/456.2; 455/456.5

(58) Field of Classification Search
USPC .................. 701/532, 520, 521, 526, 527, 468, 701/437, 447
See application file for complete search history.

(56) References Cited

U.S. PATENT DOCUMENTS

| | | | |
|---|---|---|---|
| 5,191,522 A | 3/1993 | Bosco et al. | |
| 6,067,525 A | 5/2000 | Johnson et al. | |
| 6,078,893 A | 6/2000 | Ouimet et al. | |
| 6,157,935 A | 12/2000 | Tran et al. | |
| 6,169,955 B1 | 1/2001 | Fultz | |
| 6,622,151 B1 | 9/2003 | Hamamoto et al. | |
| 6,879,836 B2 * | 4/2005 | Nakamoto et al. | 455/456.2 |
| 7,082,427 B1 | 7/2006 | Seibel et al. | |
| 7,120,629 B1 | 10/2006 | Seibel et al. | |
| 7,136,915 B2 | 11/2006 | Rieger, III | |
| 7,142,205 B2 | 11/2006 | Chithambaram et al. | |
| 7,174,301 B2 | 2/2007 | Florance et al. | |
| 7,340,410 B1 | 3/2008 | Vaillancourt et al. | |
| 7,386,318 B2 | 6/2008 | Moon et al. | |
| 7,398,093 B2 | 7/2008 | Hull et al. | |
| 7,439,969 B2 | 10/2008 | Chithambaram et al. | |
| 7,516,088 B2 | 4/2009 | Johnson et al. | |
| 7,548,915 B2 | 6/2009 | Ramer et al. | |
| 7,797,019 B2 | 9/2010 | Friedmann | |
| 7,797,642 B1 | 9/2010 | Karam et al. | |
| 7,814,142 B2 | 10/2010 | Mamou et al. | |
| 7,823,073 B2 | 10/2010 | Holmes et al. | |
| 2002/0042819 A1 | 4/2002 | Reichert et al. | |
| 2002/0055926 A1 | 5/2002 | Dan et al. | |
| 2002/0123957 A1 | 9/2002 | Notarius et al. | |
| 2002/0138612 A1 * | 9/2002 | Sekizawa | 709/224 |
| 2003/0158960 A1 | 8/2003 | Enbgerg | |
| 2004/0040602 A1 | 3/2004 | Farrar | |
| 2004/0070602 A1 | 4/2004 | Kobuya et al. | |
| 2005/0096036 A1 | 5/2005 | Haberman et al. | |

(Continued)

OTHER PUBLICATIONS

Dzenana et al., Integration of Spatial Data with Business Intelligence Systems, Dec. 16-18, 2008, pp. 447-452, BH Telecom, Bosnia.

(Continued)

*Primary Examiner* — Redhwan K Mawari
(74) *Attorney, Agent, or Firm* — Banner & Witcoff, Ltd.

(57) ABSTRACT

An enhanced geocoding module may be used to determine various physical addresses located on the same street. The enhanced geocoding module may create a grid around a predetermined location and request the physical addresses of various coordinate points located on the grid. Additional features of the module may include a display that displays the grid with physical addresses located on the same street, various statistics related to a user of the enhanced geocoding module, and a color-coded scheme that indicates the status of individuals/groups located at the physical addresses.

20 Claims, 4 Drawing Sheets

(56) References Cited

U.S. PATENT DOCUMENTS

| | | | |
|---|---|---|---|
| 2005/0113115 A1 | 5/2005 | Haberman et al. | |
| 2006/0022048 A1 | 2/2006 | Johnson | |
| 2006/0277176 A1* | 12/2006 | Liao | 707/5 |
| 2007/0096945 A1* | 5/2007 | Rasmussen et al. | 340/995.1 |
| 2007/0112729 A1 | 5/2007 | Wiseman et al. | |
| 2007/0192352 A1 | 8/2007 | Levy | |
| 2008/0082572 A1 | 4/2008 | Ballard et al. | |
| 2008/0086391 A1 | 4/2008 | Maynard et al. | |
| 2008/0086512 A1* | 4/2008 | Fahys | 707/104.1 |
| 2008/0140311 A1* | 6/2008 | Searight et al. | 701/208 |
| 2008/0214149 A1 | 9/2008 | Ramer et al. | |
| 2008/0291205 A1* | 11/2008 | Rasmussen et al. | 345/441 |
| 2008/0306840 A1 | 12/2008 | Houlihan et al. | |
| 2009/0048859 A1 | 2/2009 | McCarthy et al. | |
| 2009/0089254 A1* | 4/2009 | Von Kaenel et al. | 707/3 |
| 2009/0132502 A1* | 5/2009 | Brice et al. | 707/3 |
| 2009/0181699 A1* | 7/2009 | Tysowski | 455/457 |
| 2009/0197621 A1 | 8/2009 | Book | |
| 2009/0234745 A1 | 9/2009 | Ramer et al. | |
| 2009/0319344 A1 | 12/2009 | Tepper et al. | |
| 2010/0082444 A1 | 4/2010 | Lin et al. | |
| 2010/0114941 A1* | 5/2010 | Von Kaenel et al. | 707/769 |
| 2010/0131196 A1* | 5/2010 | Searight et al. | 701/208 |
| 2010/0131584 A1 | 5/2010 | Johnson | |
| 2010/0138299 A1 | 6/2010 | Preston et al. | |
| 2010/0251128 A1* | 9/2010 | Cordasco | 715/736 |
| 2010/0317368 A1* | 12/2010 | Augst et al. | 455/456.1 |

OTHER PUBLICATIONS

Hosokawa et al., An Implementation Method of a Location-Based Active Map Transformation System, 2005, pp. 13-21, MDM 2005 05 Ayia Napa Cyprus.

Franti et al., Location-Based Search Engine for Multimedia Phones, magazine, 2010, pp. 558-563, 2010, IEEE, Finland.

Kalasapur et al., Extracting Co-locator context, Mar. 27, 2009, pp. 1-7, http://dx.doi.org/10.4108/ICST.MOBIQUITOUS2009.6857, San Jose, CA.

Brown, Intelligent Agent based Mobile Shopper, Mar. 2009, 7 pgs., 978-1-4244-3474 © 2009 IEEE, Jamaica.

Gao et al., A Wireless-Based Virtual Salesman System, 2004, pp. 581-588, 0-7803-8145-9/04 © 2004 IEEE, San Jose, CA.

* cited by examiner

US 8,538,679 B1

ENHANCED GEOCODING

RELATED APPLICATIONS

This application is related to U.S. application Ser. No. 13/083,139, which was concurrently filed with this application, and which is herein incorporated by reference in its entirety.

TECHNICAL FIELD

Aspects of the invention generally relate to enhanced geocoding capabilities. In particular, various aspects of the invention include methods and systems for locating predetermined addresses on a map grid.

BACKGROUND

Geocoding refers to the process of finding the correct geographic coordinates (e.g., latitude and/or longitude coordinates) from data such as street addresses, zip codes, postal codes, etc. Over the years, various geocoding techniques involving address interpolation, the use of land parcel centroids, and the use of global positioning systems (GPS) have been developed.

However, problems remain with using these systems/methods for practical geocoding applications. For instance, a geocoding system may fail when several different addresses may be listed under similar names and/or when a given address encompasses an area beyond a threshold value.

Thus, advanced geocoding systems/techniques are needed for pinpointing the location of physical addresses close to a reference point.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable media, and apparatuses for locating physical addresses close to an entity on a single street. An enhanced geocoding module may be used to locate physical addresses close to a predetermined location.

With another aspect of the disclosure, an enhanced geocoding module may return physical addresses that are on a predetermined street, lane, road, alley, or some other thoroughfare. This feature may be implemented as a hardware module either in a mobile device and/or a fixed-location computing device. In either scenario, a user of the device may specify a location (e.g., latitude/longitude coordinates, street address, etc.) that the enhanced geocoding module may use as a base location or address in returning other addresses or locations situated on a single street and close to the base location or address. Alternatively, a location tracking system (e.g., global positioning system (GPS), etc.) embedded within the device may first determine the current location of a user and use the current location to return other addresses or locations situated on a single street and close to the current location or address.

Aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, there are problems associated with the way addresses are currently located on a map.

Figure 1:
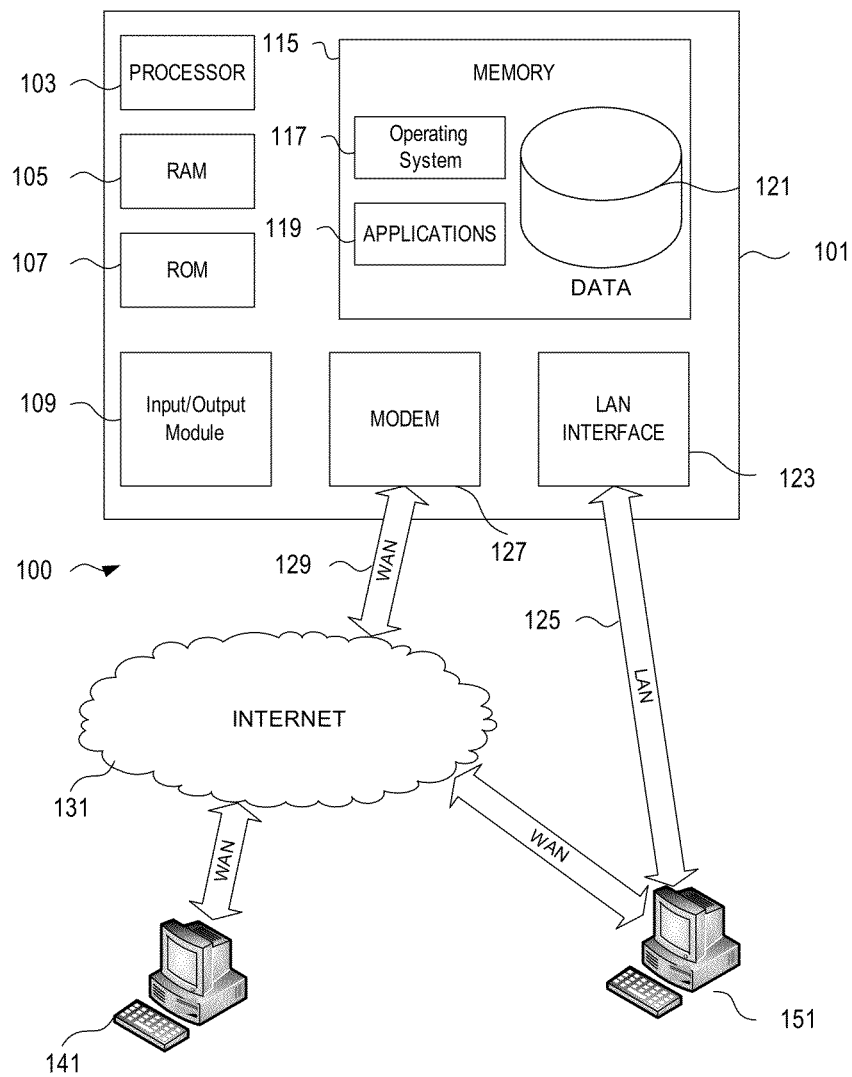
FIG. 1 shows an illustrative operating environment in which various aspects of the disclosure may be implemented.

FIG. 1 illustrates a block diagram of an enhanced geocoding module/device 101 (e.g., a computer server) in communication system 100 that may be used according to an illustrative embodiment of the disclosure. The device 101 may have a processor 103 for controlling overall operation of the enhanced geocoding module 101 and its associated components, including RAM 105, ROM 107, input/output (I/O) module 109, and memory 115.

I/O 109 may include a microphone, keypad, touch screen, and/or stylus through which a user of the enhanced geocoding module 101 may provide input, and may also include one or more of a speaker for providing audio output and a video display device for providing textual, audiovisual and/or graphical output. Software may be stored within memory 115 and/or storage to provide instructions to processor 103 for enabling module 101 to perform various functions. For example, memory 115 may store software used by the device 101, such as an operating system 117, application programs 119, and an associated database 121. Processor 103 and its associated components may allow the device 101 to run a series of computer-readable instructions to generate a rectangular grid for determining the physical addresses that are closest to a given location. For instance, when the geocode of a mobile device is determined, processor 103 may create a grid with the geocode of the mobile device at the center of the grid. In addition, processor 103 may create several coordinate points around the center of the grid so that a reverse geocoding server may be called to reverse the geocodes of the various coordinate points into physical addresses.

The server 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may be a reverse geocoding server called by module 101 to reverse the geocode of various coordinate points on a grid into physical addresses. The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced geocoding module 101 according to an illustrative embodiment of the disclosure may include computer executable instructions for invoking functionality related to creating a rectangular grid for locating addresses on a single street.

Enhanced geocoding module 101 and/or terminals 141 or 151 may also be mobile terminals, such as smart phones, personal digital assistants (PDAs), etc. including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
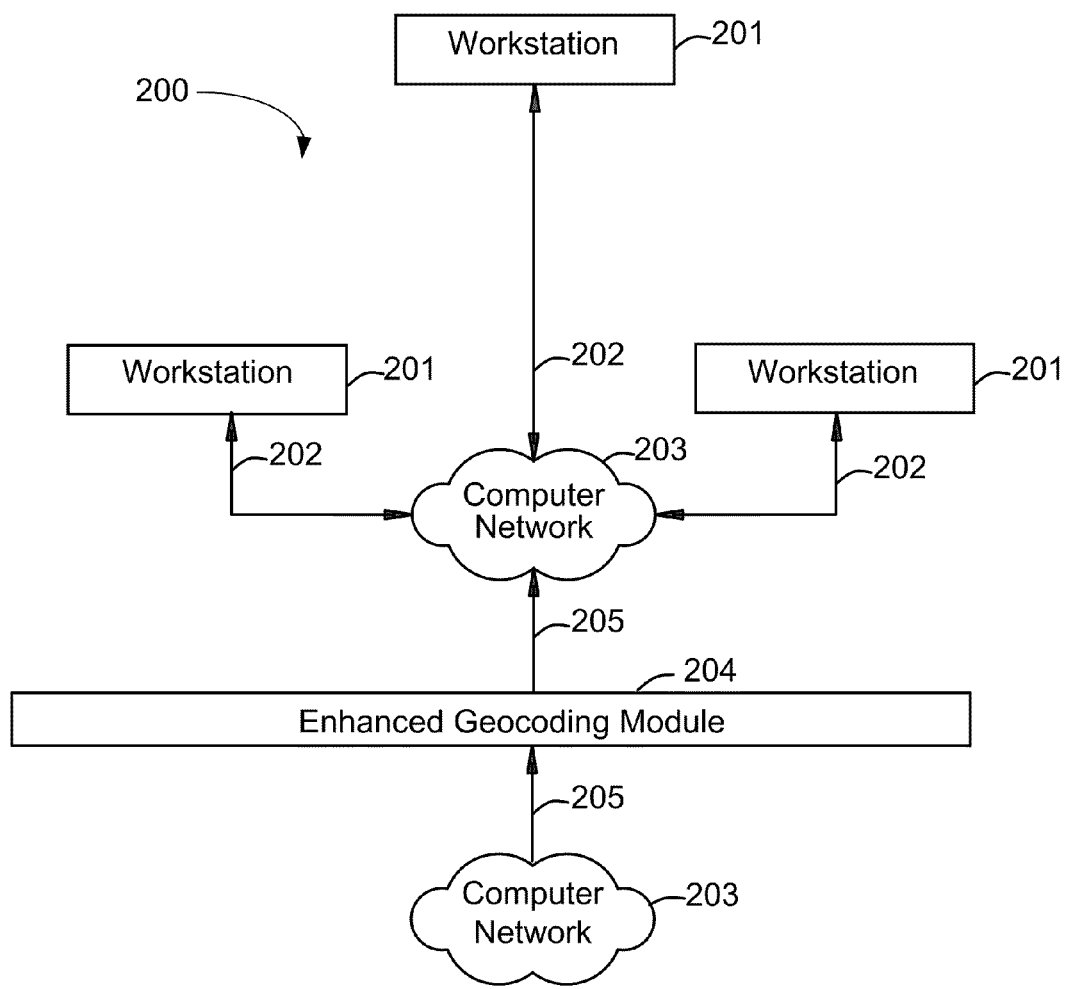
FIG. 2 is an illustrative block diagram of workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the enhanced geocoding module 204. In certain embodiments, workstations 201 may be different servers that reverse the geocode of coordinate points provided by module 204, or, in other embodiments, workstations 201 may be different computing devices (e.g., mobile devices) mapped by enhanced geocoding module 204. In system 200, the enhanced geocoding module 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The disclosure that follows in the Figures may be implemented by one or more of the components in FIGS. 1 and 2 and/or other components, including other computing devices.

In accordance with various aspects of the disclosure, methods, computer-readable media, and apparatuses are disclosed in which an enhanced geocoding module 204 may locate addresses located on a single street, lane, alley, gulley, road, or other thoroughfare. To accomplish this task, the geocode of the enhanced geocoding module 204 may be extracted. In some embodiments, the geocode of a predetermined point specified by a user using enhanced geocoding module 204 may be extracted. The geocode may refer to any of several geospatial attributes, including latitude, longitude, altitude, date, time, and/or internet protocol (IP) address. Then the enhanced geocoding module 204 may create a grid with a predetermined granularity around the extracted geocode. The granularity of a grid may refer to the distance between any two coordinate points of the grid. The extracted geocode of enhanced geocoding module 204 may be located at the center of the grid; then enhanced geocoding module 204 may create several coordinate points around the grid. Next, enhanced geocoding module 204 may make a batch request to a server (e.g., via an application programming interface (API) of a server such as one maintained by Google, Microsoft, etc.) to reverse the geocodes of each of the coordinate points on the grid into physical addresses.

Once a call is made to the reverse geocoding server (e.g., terminals 141/151 and/or workstations 201) to reverse the geocode of a given coordinate point, this coordinate point and its associated physical address may be saved in a memory of the enhanced geocoding module 204 to avoid having to make repeated calls to the reverse geocoding server for the same physical address.

Enhanced geocoding module 204 may then sort the physical addresses in order of how far they are from the enhanced geocoding module 204. The physical addresses that are the closest to the enhanced geocoding module 204 may then be presented to a user on a display screen of the enhanced geocoding module 204. All of the physical addresses located on a single street may be grouped and presented to a user in an order consistent with how far the physical addresses are from the user of the enhanced geocoding module 204 or consistent with how far the physical addresses are from some other user specified location. In this way, the enhanced geocoding module 204 may present physical addresses to a user via a two-tiered sorting technique-first the addresses may be sorted by street and then these same-street addresses may be sorted by distance from the enhanced geocoding module 204.

In addition, enhanced geocoding server 204 may overlay various icons related to the returned physical addresses on a map representing the addresses. These icons may be supplied to the enhanced geocoding server 204 by the reverse geocoding server, along with the physical addresses. The icons may be used to represent physical addresses (e.g., homes, business addresses, etc.) that may have a record in a database (e.g., workstation 201) maintained by an entity using the enhanced geocoding module 204.

In an alternate embodiment, enhanced geocoding module 204 may use a predetermined global positioning system (GPS) coordinate to draw a circle around the GPS coordinate and determine the radial distances of the nearest physical addresses to the GPS coordinate. Therefore, instead of drawing a grid, enhanced geocoding module 204 may use various points within the circle to make a batch request to a reverse geocoding server for physical addresses associated with one or more GPS coordinates within the circle.

One of the drawbacks of this technique is that by looking at the radial distances to a given GPS coordinate, the reverse geocoding server may return physical addresses that are not located on the same street, alley, road, gulley, and/or other thoroughfare. Thus, these addresses may not in fact be the closest physical addresses to a given location, as determined by the amount of time that it takes to walk, drive, etc. to the addresses.

As opposed to techniques involving the use of radial distances from a given GPS coordinate, the approach of using grids for finding the nearest physical address allows addresses on the same street, lane, alley, gulley, road, or other thoroughfare to be located.

The distance between grid points may be variable and may be presented in any distance units, including miles, kilometers, feet, yards, etc. For instance, the coordinate points of the grid may be close together when mapping densely populated urban areas and may be farther apart when mapping sparsely populated rural areas. In other embodiments, the distance between grid points may be an average value, regardless of the area being mapped.

The grid itself may be a rectangular grid. In some aspects, the size of the grid may be created so as to minimize the number of calls to the reverse geocoding server. For some applications, the grid may include 81 coordinate points.

The geographical area covered by the grid points may be determined by a zoom level, as set by the enhanced geocoding server 204. An appropriate zoom level may need to be chosen in order to allow the proper coordinate points to be returned by the reverse geocoding server.

Figure 3:
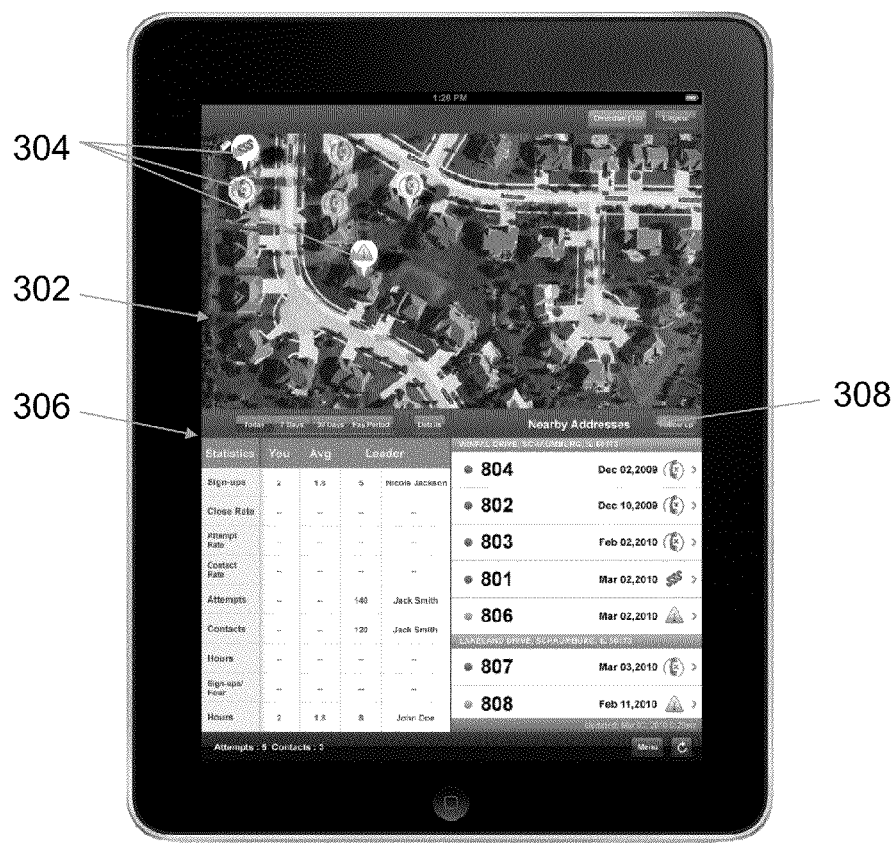
FIG. 3 shows a sample display screen associated with enhanced geocoding module in accordance with one or more aspects of the disclosure.

FIG. 3 shows a sample display screen 300 associated with enhanced geocoding module 204 in accordance with at least one aspect of the disclosure. The display screen associated the enhanced geocoding module 204 may present a map 302 with various physical addresses located on the same street that are close to the enhanced geocoding module 204 and the icons 304 associated with those addresses. The display screen 300 may also present a statistics section 306 on individuals/ groups associated with an entity managing the enhanced geocoding module 204. For instance, a company may use the enhanced geocoding module 204 to track the performance of its salespersons as they visit various homes within a neighborhood (e.g., for selling and/or delivering milk, insurance, etc.).

The statistics in statistics section 306 may be displayed over various time periods, including a day, week, month, or pay period. Statistics in statistics section 306 may be shown for a given individual/group (e.g., a user of enhanced geocoding module 204), as well as the average value of various statistics for an entire group and the identity of the leader of each statistic. The statistics may include a given salesperson's sign-ups, close rate, attempt rate, contact rate, attempts, contacts, hours, and sign-ups per hour. The salesperson's sign-ups may relate to the number of customers that the salesperson actually convinced to signup for services/products provided by the company, the close rate may represent the number of sign-ups attributed to a given salesperson compared to the total number of potential customers visited, the attempt rate may refer to the total number of potential customers that a given salesperson visits, the contact rate may refer to the total number of potential customers that a given salesperson contacts using any communication modality (e.g., phone, mail, etc.), the attempts may refer to the total number of attempts made by a given salesperson at acquiring new customers, the contacts may refer to the total number of contacts or leads for potential customers as developed by a given salesperson, the hours may refer to the total number of hours that a given salesperson spends mining for potential customers, and the sign-ups per hour may refer to the number of sign-ups attributed to a given salesperson per hour on the job.

The display screen 300 may also display a physical addresses section 308 in which various physical addresses that are shown on the map 302 are shown, sorted by street and distance from the enhanced geocoding module 204. In displaying the physical addresses section 308, the display screen 300 may also use various color codes (e.g., red, yellow, green) to represent the status of potential customers/customers located at the physical address. In one embodiment, red may be used to designate physical addresses that house current customers of a company using enhanced geocoding module 204, yellow may be used to designate physical addresses that house former customers of the company, and green may be used to designate physical addresses that house potential customers of the company.

Figure 4:
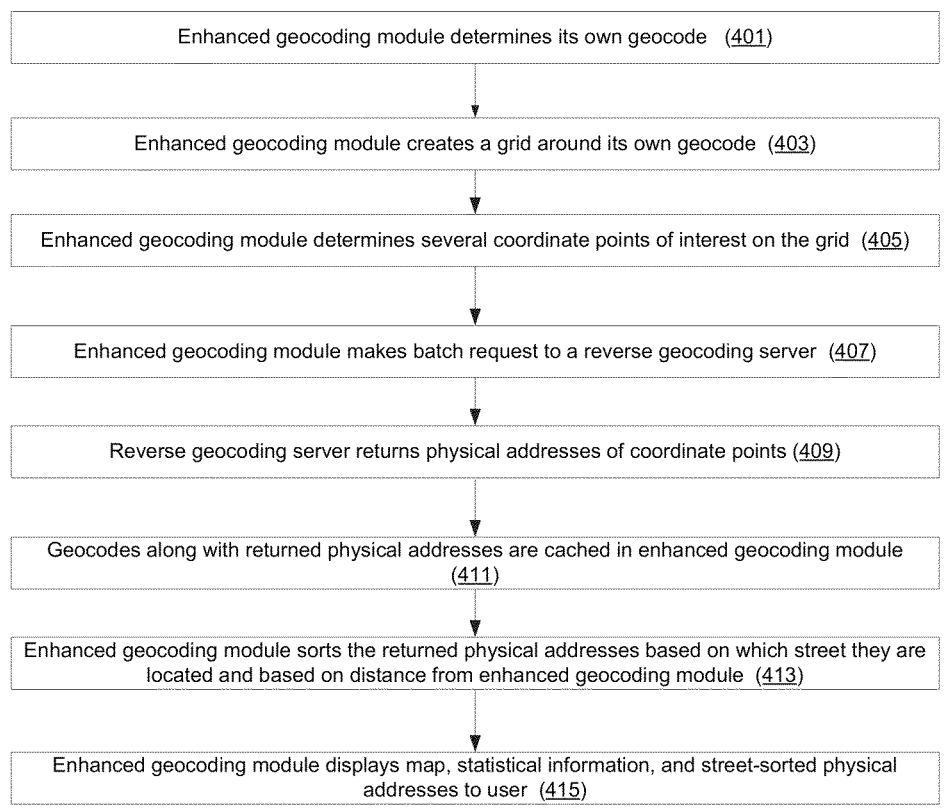
FIG. 4 shows a sample method that may be performed with an enhanced geocoding module in accordance with one or more aspects of the disclosure.

FIG. 4 shows a sample method that may be performed with an enhanced geocoding module 204 in accordance with at least one aspect of the disclosure. The process may start out at step 401 where the enhanced geocoding module 204 may determine its own geocode (e.g., a geocode of a mobile device or a fixed computing device provides the geocode of a desired location). The process may then move to step 403 where the enhanced geocoding module 204 may create a grid around its own geocode or some other user-specified geocode. The grid may be a rectangular grid with a specified granularity.

The process may then move to step 405 where the enhanced geocoding module 204 may determine several coordinate points of interest on the grid. These coordinate points may represent locations that are close to the present location of the module 204. The enhanced geocoding module 204 may then make a batch request to a reverse geocoding server to provide the street-level addresses of the coordinate points in step 407.

Once the request is made, the reverse geocoding server may return the physical addresses of the coordinate points in step 409. The geocodes along with the returned physical addresses may be cached in the enhanced geocoding module 204 in step 411. The process may then move to step 413 where the enhanced geocoding module 204 may sort the returned physical addresses based on the street location and based on the distance from the enhanced geocoding module 204 and/or the distance from a user-specified point (e.g., in the case where the enhanced geocoding module 204 is a fixed computing device requesting addresses around a given coordinate point).

Finally, the process may move to step 415 where the enhanced geocoding module 204 may display a map, statistical information, and street-sorted physical addresses to a user. As described earlier, the map may include icons that indicate the status of various potential groups/individuals that may or may not be customers of an entity using the enhanced geocoding module 204. The statistical information may detail various statistics on individuals/groups associated with the entity (e.g., customer sign-ups, hours logged, etc.).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. One or more non-transitory computer-readable storage mediums having computer-executable program instructions stored thereon that when executed by one or more processors, cause the processors to perform steps comprising:
   (i) determining a geocode of a current location of a traveling salesperson;
   (ii) determining a plurality of coordinate points on a grid that has the geocode of the current location at center of the grid, wherein a spacing of the coordinate points on the grid is such that physical addresses corresponding to at least some of the coordinate points are on a same thoroughfare as the current location, wherein the spacing of the coordinate points is based on a predetermined factor comprising at least one of: population density, zoom level of a geographical area covered by the grid, average spacing value, a spacing that includes 81 coordinate points on the grid, and a rectangular grid shape;
   (iii) transmitting, to a reverse geocoding server, a batch request for a plurality of physical addresses corresponding to the plurality of coordinate points;
   (iv) receiving the plurality of physical addresses corresponding to the plurality of coordinate points;
   (v) caching the plurality of physical addresses and the plurality of coordinate points in a memory;
   (vi) sorting the plurality of physical addresses such that the physical addresses closest to the current location, as determined by an amount of time to walk to the physical address from the current location, are near a top of a sorted list; and
   (vii) displaying, in association with the physical addresses in the sorted list, those statistics, including a customer status indicator and an indication of a number of sign-up attempts, associated with the physical addresses in the sorted list in order to assist the traveling salesperson.

2. The computer-readable storage medium of claim 1, wherein the plurality of physical addresses are located close to the current location.

3. The computer-readable storage medium of claim 1, wherein the plurality of physical addresses are further sorted based on street name.

4. The computer-readable storage medium of claim 1, wherein the processor further performs: displaying the grid and an identifier of the sorted physical addresses on the grid.

5. The computer-readable storage medium of claim 1, wherein the processor further performs: displaying a plurality of statistics related to the traveling salesperson.

6. The computer-readable storage medium of claim 5, wherein the plurality of statistics includes a number of customer sign-ups attributed to the traveling salesperson.

7. The computer-readable storage medium of claim 5, wherein the plurality of statistics includes a number of hours spent by the user to sign customers.

8. A method for use by a traveling salesperson comprising:
   (i) by a location tracking system embedded in a computing device, determining a current location of the traveling salesperson;
   (ii) by the processor, determining a plurality of geocodes on a grid that has the current location at center of the grid, wherein a spacing of geocodes on the grid is such that physical addresses corresponding to at least some of the geocodes are on a same thoroughfare as the current location, wherein the spacing of geocodes is based on a predetermined factor comprising at least one of: population density, zoom level of a geographical area covered by the grid, average spacing value, a spacing that includes 81 geocodes on the grid, and a rectangular grid shape;
   (iii) by a communication module associated with the computing device, transmitting, to a reverse geocoding server, a batch request for a plurality of physical addresses corresponding to the plurality of geocodes;
   (iv) by the communication module, receiving the plurality of different physical addresses corresponding to the plurality of geocodes;
   (v) by the processor, sorting the plurality of physical addresses such that the physical addresses closest to the current location, as determined by an amount of time to walk to the physical address from the current location, are near a top of a sorted list; and
   (vi) by the processor, displaying in association with the physical addresses in the sorted list, those statistics, including a customer status indicator and an indication of a number of sign-up attempts, associated with the physical addresses in the sorted list in order to assist the traveling salesperson.

9. The method of claim 8, further comprising: by a display device associated with the computing device, displaying the sorted physical addresses on the grid to a user.

10. The method of claim 9, further comprising: by the display device, displaying the grid and an identifier of the sorted physical addresses on the grid to the user.

11. The method of claim 9, further comprising: by the display device, displaying a plurality of statistics related to an ability of the user to sign-up new customers for a company that employs the user.

12. The method of claim 9, further comprising: by the display device, displaying a color-coded scheme to indicate whether each of the sorted physical addresses includes a potential customer, a current customer, or a former customer.

13. The method of claim 8, further comprising: by the processor, caching the plurality of physical addresses and the plurality of geocodes in a memory of the computing device.

14. The method of claim 8, wherein the grid includes 81 geocodes.

15. The method of claim 8, wherein the spacing of the geocodes is based on the population density.

16. An apparatus comprising:
   a processor; and
   a non-transitory memory configured to store computer-readable instructions that, when executed by the processor, cause the processor to perform a method comprising:
      (i) determining a geocode of a current location of a traveling salesperson;
      (ii) determining a plurality of coordinate points on a grid that has the current location at center of the grid, wherein a spacing of the coordinate points on the grid is such that physical addresses corresponding to at least some of the coordinate points are on a same thoroughfare as the current location, wherein the spacing of the coordinate points is based on a predetermined factor comprising at least one of: population density, zoom level of a geographical area covered by the grid, average spacing value, a spacing that includes 81 coordinate points on the grid, and a rectangular grid shape;
      (iii) transmitting, to a reverse geocoding server, a batch request for a plurality of physical addresses corresponding to the plurality of coordinate points;

(iv) receiving the plurality of physical addresses corresponding to the plurality of coordinate points;

(v) caching the plurality of physical addresses and the plurality of coordinate points in the memory;

(vi) sorting the plurality of physical addresses such that the physical addresses closest to the current location, as determined by an amount of time to walk to the physical address from the current location, are near a top of a sorted list; and (vii) displaying, in association with the physical addresses in the sorted list, those statistics, including a customer status indicator and an indication of a number of sign-up attempts, associated with the physical addresses in the sorted list in order to assist the traveling salesperson.

17. The apparatus of claim 16, wherein the grid is rectangular.

18. The apparatus of claim 17, wherein the rectangular grid includes 81 points.

19. The apparatus of claim 16, wherein the plurality of physical addresses are sorted based on a street name and distance from the apparatus.

20. The apparatus of claim 16, wherein the spacing of the geocodes is based on the population density.

\* \* \* \* \*